US012619729B2

(12) United States Patent
    Varjaques et al.

(10) Patent No.:  US 12,619,729 B2
(45) Date of Patent:       May 5, 2026

(54) SYSTEM AND METHOD FOR DECONTAMINATING AND CERTIFYING EXTERNAL STORAGE DEVICES

(71) Applicant: TYREX US, New Rochelle, NY (US)

(72) Inventors: Gerard Varjaques, New Rochelle, NY (US); Christophe Bourel, Clichy (FR); Jean Gatignol, Clichy (FR)

(73) Assignee: TYREX US, New Rochelle, NY (US)

( * ) Notice: Subject to any disclaimer, the term of this patent is extended or adjusted under 35 U.S.C. 154(b) by 147 days.

(21) Appl. No.: 18/428,810

(22) Filed: Jan. 31, 2024

(65) Prior Publication Data

US 2024/0256669 A1      Aug. 1, 2024

Related U.S. Application Data

(60) Provisional application No. 63/442,635, filed on Feb. 1, 2023.

(51) Int. Cl.
   *G06F 21/56*       (2013.01)
   *H04L 9/32*        (2006.01)
(52) U.S. Cl.
   CPC .......... *G06F 21/568* (2013.01); *G06F 21/562* (2013.01); *G06F 21/567* (2013.01); *H04L 9/3268* (2013.01)

(58) Field of Classification Search
   CPC .... G06F 21/568; G06F 21/567; G06F 21/562; H04L 9/3268
   See application file for complete search history.

(56) References Cited

U.S. PATENT DOCUMENTS

| | | | | |
|---|---|---|---|---|
| 2008/0282350 A1* | 11/2008 | Khilnani | ................. | G06F 21/57 |
| | | | | 713/2 |
| 2013/0074187 A1* | 3/2013 | Kim | ....................... | G06F 21/567 |
| | | | | 726/24 |
| 2016/0328579 A1* | 11/2016 | Jois | ......................... | G06F 21/85 |
| 2022/0366046 A1* | 11/2022 | Cheng | ................... | G06F 21/564 |

* cited by examiner

*Primary Examiner* — Ellen Tran
(74) *Attorney, Agent, or Firm* — David L. Cohen

(57)                ABSTRACT

The present disclosure provides a cleaning station configured to decontaminate external storage devices from cybersecurity threats. The cleaning station is configured to scan files in the external storage device using a decontamination means, the decontamination means including one or more anti-virus modules and one or more anti-malware modules. The cleaning station decontaminates the external storage device, and generates an electronic certificate on the external storage device. The cleaning station receives an update signal from a master server, through a management server, which ensures the decontamination means are updated with signatures updates.

17 Claims, 7 Drawing Sheets

100B
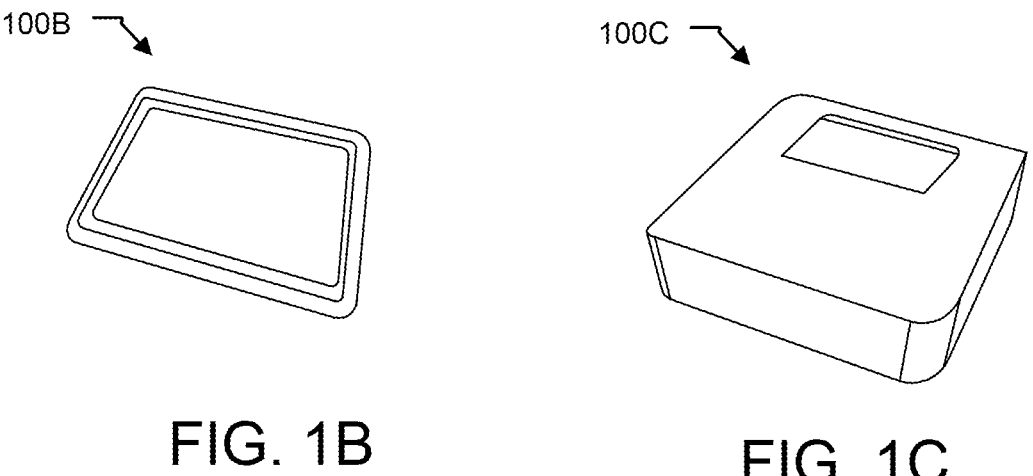
FIG. 1B
100C
FIG. 1C
100D
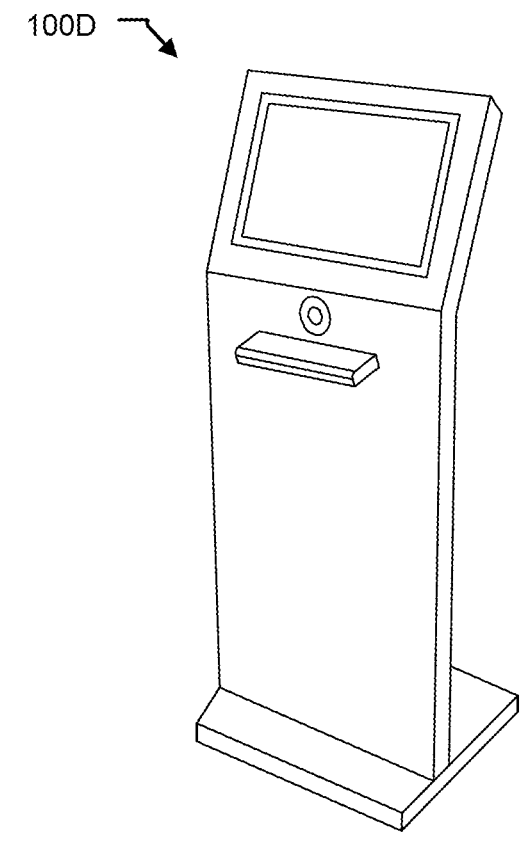
FIG. 1D

300A

300B

400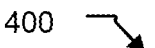

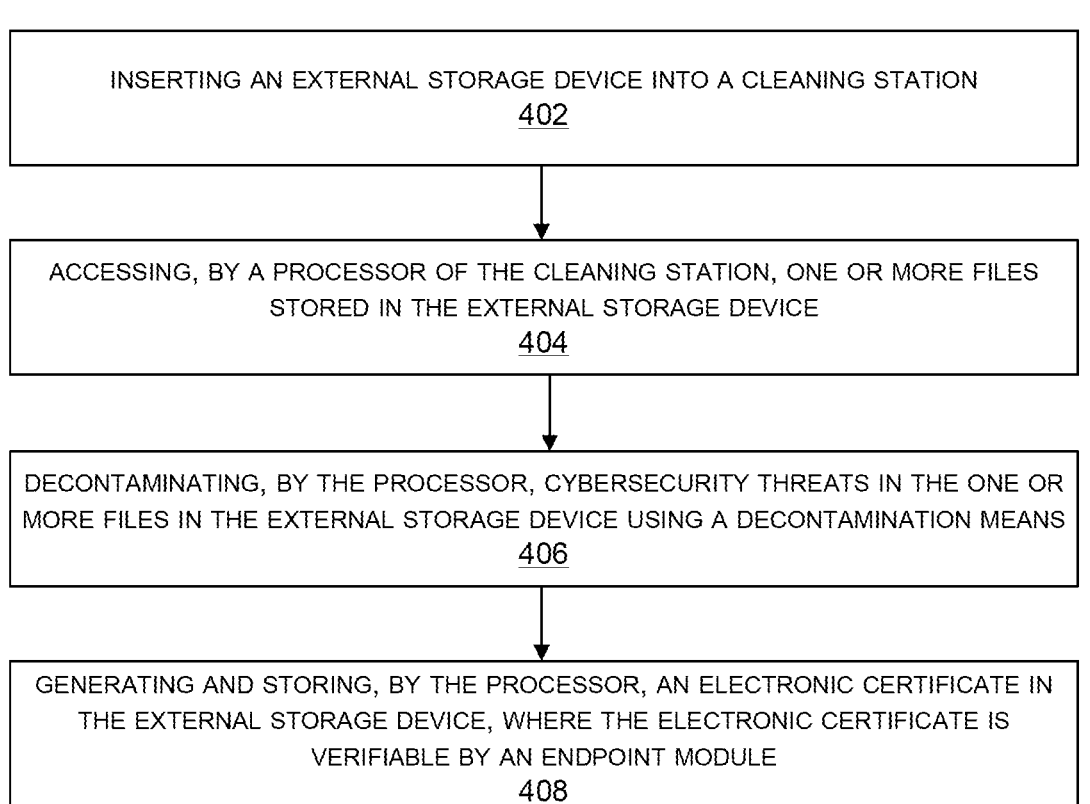

INSERTING AN EXTERNAL STORAGE DEVICE INTO A CLEANING STATION
402

ACCESSING, BY A PROCESSOR OF THE CLEANING STATION, ONE OR MORE FILES STORED IN THE EXTERNAL STORAGE DEVICE
404

DECONTAMINATING, BY THE PROCESSOR, CYBERSECURITY THREATS IN THE ONE OR MORE FILES IN THE EXTERNAL STORAGE DEVICE USING A DECONTAMINATION MEANS
406

GENERATING AND STORING, BY THE PROCESSOR, AN ELECTRONIC CERTIFICATE IN THE EXTERNAL STORAGE DEVICE, WHERE THE ELECTRONIC CERTIFICATE IS VERIFIABLE BY AN ENDPOINT MODULE
408

SYSTEM AND METHOD FOR DECONTAMINATING AND CERTIFYING EXTERNAL STORAGE DEVICES

BACKGROUND

Field of the Disclosure

The present disclosure generally relates to cybersecurity. Particularly, the present disclosure relates to a cleaning station to sanitize external storage devices from cyber security threats, and a system and a method to ensure provable integrity, security, and authenticity of external storage devices in varied operational and regulated environments.

Description of Related Art

This section intends to provide a background discussion for a clear understanding of the disclosure herein but makes no claim nor any implication as to what is the relevant art for this disclosure.

External storage devices, such as Universal Serial Bus (USB) flash drives, are commonly used to transfer data between two computing devices. External storage devices are particularly useful when wired or wireless communication means is not available between the two computing devices, or when bandwidth or data transfer rates provided by the wired or wireless communication means are insufficient or impractical for transferring the subject data.

However, external storage devices are susceptible to being infected by cybersecurity threats, and further contribute to the dissemination of the cybersecurity threats. The transfer of data in the modern networked computing environment is highly vulnerable to malware and security risks. If a cybersecurity threat, such as malware, viruses, ransomwares, spywares, etc., is introduced in one computing node of a network, they can self-replicate and infect all computing devices in the network. Cybersecurity threats to a single computing node may be introduced using any number of techniques. One known approach for infesting an entire network is to allow the cybersecurity threat to enter a computing device through the use of external storage devices, such as an external hard drive or flash drive containing cybersecurity threats, like, for example, malware, viruses, or spyware. Given their ubiquity and wide range of applications, it is important to have means to ensure that cybersecurity threats are not proliferated through external storage devices, particularly in safety critical computing device/networks such as in commercial or industrial settings.

While anti-malware or antivirus solutions have been proposed that detect and remove such cybersecurity threats, they still suffer from several practical and technical challenges. Some practical challenges include the lack of means to scan and decontaminate the external storage devices before they are connected to the computing devices of interest. Since existing anti-virus or anti-malware solutions are software that are installed within the computing devices, they necessitate the external storage device to be connected to the computing devices before they can be scanned and decontaminated. However, in such scenarios, existing solutions risk allowing the computing devices to be infected by new viruses, malware, and vulnerabilities not in their cybersecurity threat definition databases. Further, existing anti-virus and anti-malware software also require significant amounts of computational resources to scan and decontaminate the external storage devices, which may lead to increased waiting times while accessing files of a known external storage device, risk false positives, etc.

While multiple complementary anti-virus and anti-malware solutions can be employed for more comprehensive protection against such cybersecurity threats, having to run multiple antivirus solutions further exacerbates the problem of computational expenditure and redundancy thereof in certain cases.

Further, existing solutions require data in the external storage device to be scanned each time it is connected to the computing device, as the computing device may not necessarily be able to identify if the data in the external storage device was modified since the last scan. Running scans at each connection can be computationally expensive and often redundant. For instance, if a user reconnects a scanned USB flash drive to a computing device within a few minutes of operation without modifying the data therein, or modifying the data with a file known to be safe, existing anti-virus solutions may still rescan the data.

Other solutions include scanning or emulating the data in the external storage device in a sandbox, a virtual machine, or a sacrificial computing device. However, everyday users do not have the wherewithal or expertise to set up such solutions and analyze the data in such safe environments.

Therefore, there is a need for a cleaning station to sanitize external storage devices with minimal computational expenditure and redundancy on computing devices.

SUMMARY

In an aspect, the present disclosure provides a cleaning station to decontaminate external storage devices. The cleaning station is configured to scan one or more files in an external storage device connected to the cleaning station to determine a presence of one or more cybersecurity threats using a decontamination means. The decontamination means includes one or more anti-virus modules and one or more anti-malware modules. In response to a positive determination of the presence of the one or more cybersecurity threats in the one or more files, the cleaning station is configured to decontaminate the external storage device from the one or more cybersecurity threats using the decontamination means. In response to decontaminating the external storage device or a negative determination of the presence of the one or more cybersecurity threats, generate and store an electronic certificate on the external storage device.

In some embodiments, the cleaning station may be further configured to transmit a signal to a display interface of the cleaning station to indicate the presence of the one or more cybersecurity threats.

In some embodiments, the cleaning station may be further configured to receive a decontamination method signal from the display interface. The decontamination method signal may include an instruction from an operator to either remove, neutralize, or isolate the one or more cybersecurity threats, and/or repair the one or more files in the external storage device. In some embodiments, the cleaning station may decontaminate the one or more files in the external storage device based on the instruction in the decontamination method signal.

In some embodiments, the cleaning station may be further configured to receive an update signal from a master server, and update the one or more anti-virus modules based on the update signal.

In some embodiments, the cleaning station may be further configured to, transmit an update request signal to the master server at predetermined intervals, the update request signal may include an Internet Protocol (IP) address associated with the cleaning station, and receive the update signal from the master server in response thereto.

In some embodiments, the cleaning station may be configured to transmit the update request signal and receive the update signal to and from the master server, respectively, through a management server.

In some embodiments, the cleaning station may be configured to transmit activity data to a management server, the activity data being generated during scanning and decontamination of the one or more files and generating the electronic certificate.

In some embodiments, the cleaning station may be air-gapped from the management server. In some embodiments, the cleaning station may be configured to offload the activity data to a trusted external storage device.

In some embodiments, the cleaning station may be air-gapped. In some embodiments, the cleaning station may be configured to receive an update signal from a trusted external storage device, and wherein the trusted external storage device may be loaded with one or more signature updates in the update signal from a master server.

In some embodiments, to scan the one or more files to determine the presence of the one or more cybersecurity threats, the cleaning station may be configured to successively scan one or more partitions that partition the one or more files in the external storage device.

In some embodiments, the cleaning station may be further configured to, receive a bypass signal from a user, the bypass signal indicating a partition from the one or more partitions that may be to be skipped from scanning, and skip the scanning of the partition based on the bypass signal.

In some embodiments, the cleaning station may be configured to concurrently scan and decontaminate the one or more files in the external storage device using each of the one or more anti-virus modules and the one or more anti-malware modules.

In some embodiments, the electronic certificate may include a time stamp value indicating a time at which a time stamp was created, and wherein the electronic certificate expires after a predetermined duration since the time stamp value has elapsed.

In some embodiments, the electronic certificate may be configured to be invalidated when data in the external storage device may be modified.

In some embodiments, validity of the electronic certificate may be verifiable by an endpoint module associated with a computing device, and wherein on successful validation of the electronic certificate, the one or more files in the external storage device are loaded and executed at the computing device.

In another aspect, a master server is configured receive one or more signature updates for one or more anti-virus modules of a decontamination means from one or more vendors. The master server is configured to receive an update request signal from one or more cleaning stations either directly or through a management server, and verify identity of the one or more cleaning stations or the management server. The identity of the one or more cleaning stations or the management server may be verified using a corresponding Internet Protocol (IP) address provided in the update request signal, and on successful verification, transmit an update signal having the one or more signature updates to the one or more cleaning stations either directly or through the management server.

In some embodiments, the master server may be further configured to transmit a set of initialization signals to install the decontamination means in the one or more cleaning stations.

In some embodiments, the master server may be further configured to, establish an encrypted communication channel with the management server, and transmit the update signal to the management server at a predetermined updating interval based on one or more configuration parameters associated with the management server.

In another aspect, a method for decontaminating external storage devices includes inserting an external storage device into a cleaning station. The method includes accessing, by a processor of the cleaning station, one or more files stored in the external storage device, and decontaminating, by the processor, one or more cybersecurity threats in the one or more files in the external storage device using a decontamination means. The decontamination means may include one or more anti-virus modules and one or more anti-malware modules. The method further includes generating and storing, by the processor, an electronic certificate in the external storage device. The electronic certificate may be verifiable by an endpoint module.

Other aspects of the disclosure will be apparent from the following description and the appended claims.

BRIEF DESCRIPTION OF THE DRAWINGS

The present disclosure and its various features and advantages can be understood by referring to the accompanying drawings by those skilled in the art relevant to this disclosure. Reference numerals and/or symbols are used in the drawings. The use of the same reference in different drawings indicates similar or identical components, devices or systems. Various other aspects of this disclosure, its benefits and advantages may be better understood from the present disclosure herein and the accompanying drawings described as follows:

FIGS. 1A to 1D illustrate representations of a cleaning station, according to embodiments of the present disclosure;

FIG. 4 illustrates a flow chart of an example method for decontamination of external storage devices, according to embodiments of the present disclosure.

DETAILED DESCRIPTION

Figure 1A:
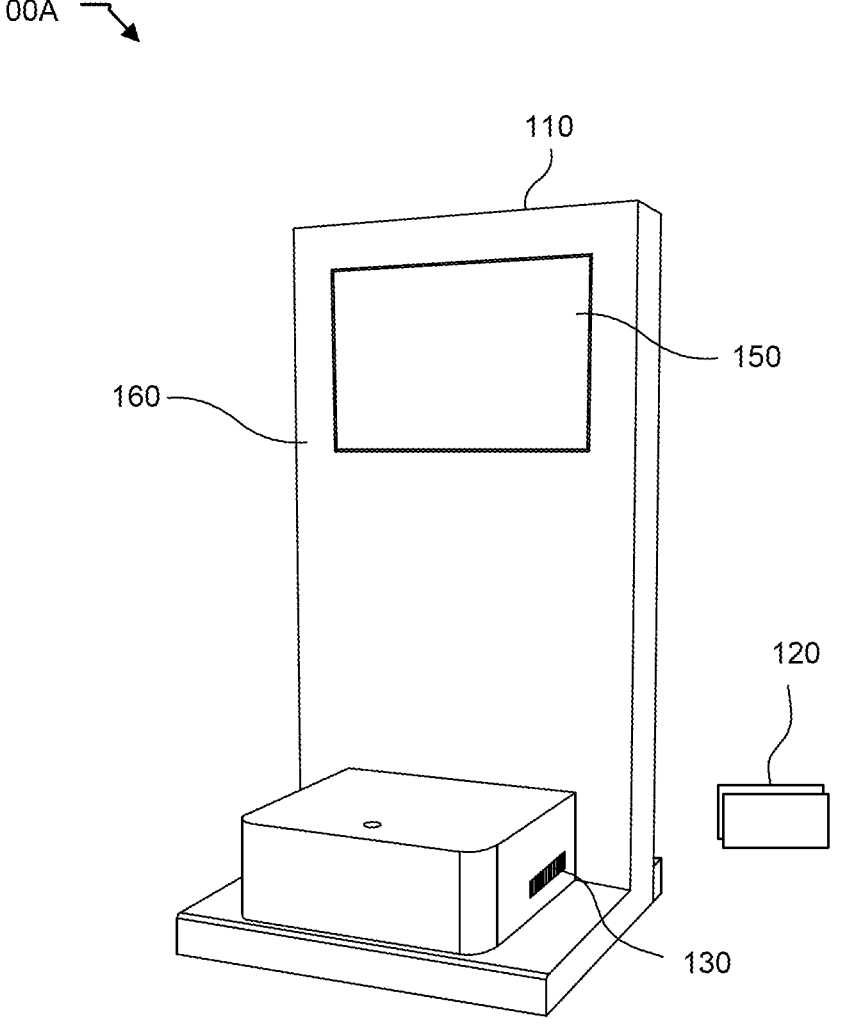

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it would have been apparent to one of ordinary skill in the art that the disclosure may be practiced without these specific details. In other instances, well-known features have not been described in detail to avoid unnecessarily complicating the description.

External storage devices, such as Universal Serial Bus (USB) flash drives, are readily available, inexpensive, and portable data storage devices. External storage devices are popular for storing and transporting data and files from one computing device to another. External storage devices are particularly useful when wired or wireless communication between two computing devices is not available. However, external storage devices are also susceptible to being infected by cybersecurity threats, and can facilitate dissemination of the cybersecurity threats. By installing viruses, malware, or other pernicious cybersecurity threats, cyber attackers may use these external storage devices as hosts for infecting other computers.

In some examples, cyber attackers may compromise the external storage devices, by infecting seemingly harmless files, such as "picture frames," with cybersecurity threats during their production. When a user obtains possession of the external storage device and connects it to their computing device, the cybersecurity threat may infect and propagate through the user's computing device. Once the infected external storage device is connected to the computer device, the cybersecurity threats therein, such as hidden malware, can execute various malicious activities, such as stealing sensitive information, initiating unauthorized access, or disrupting normal system functions. Cybersecurity threats may also obtain unrestricted access and control over computing devices, and may lock the computing devices (or data therein) from users, such as in ransomwares.

The cybersecurity threat can also be configured to steal a copy of the user's sensitive information, and transmit the stolen information to third-party devices either directly (through wireless communication capabilities built into the external storage device) or through the Internet, unbeknownst to the user.

In other examples, a cyber attacker may plug the infected external storage device into an unattended computing device of the user, quickly reboot the computing device using instructions stored in the external storage device, and copy the memory of the computing device, including passwords, encryption keys, and other sensitive data stored therein. In such examples, victims/users may not even realize that their computing devices were attacked. Furthermore, the external storage devices are not backed-up nor encrypted, thereby allowing unauthorized users to access the data storage in the external storage devices if they are lost or stolen.

Since many industries including aeronautics, defense, shipping, logistics, automotive, and many others, are relying increasingly on digital solutions, and often use external storage devices for transferring data between two or more computing devices, it is important to implement cybersecurity measures to prevent cybersecurity threats from stealing data or obtain unauthorized access or control over computing devices used in such industries.

While existing anti-virus and anti-malware solutions are capable of detecting and removing cybersecurity threats from the external storage devices, such solutions suffer from practical and technical challenges of requiring significant amount of computational resources for scanning and decontaminating the external storage devices each time it is connected to the computing device, requiring constant updates for protection against novel cybersecurity threats or newly discovered vulnerabilities, operational delays due to significant scanning times and false positives, lack of sandbox environments, virtual machines, or sacrificial computing devices for analyzing behavior of cybersecurity threats, and the like. Further, existing solutions are also configured to scan the external storage devices each time they are connected to the computing devices, which may be redundant when the external storage devices are inserted into the computing devices within a short duration of time or when files stored therein have not been modified between each insertion.

The present disclosure solves at least some of the aforementioned problems, by providing a cleaning station, a method, and a system for scanning, decontaminating, and certifying external storage devices. The cleaning station, and the system and the method of the present disclosure, allow the external storage devices to be decontaminated before they are connected to user's computing devices. Various embodiments of the present disclosure will be explained in detail with reference to FIGS. 1-5.

Referring to FIGS. 1A-1D, example representations (100A, 100B, 100C, and 100D) of a cleaning station 110 are illustrated.

As shown in FIGS. 1A-1D, the cleaning station 110 includes a port 130 configured to receive and connect to an external storage device 120. The external storage device 120 may include, but not limited to, a Universal Serial Bus (USB) flash drive, a memory card, a Compact Disc (CD), a solid-state drive (SSD), a hard drive disk (HDD), a floppy, a tape drive, a key, a smart phone, and the like. Hardware implementation of the port 130 may be suitably adapted based on the form factor of the external storage device 120. The port 130 may be configured to allow data to be exchanged between the cleaning station 110 and the external storage device 120. Once connected with the external storage device 120, the port 130 may allow the cleaning station 110 to read and retrieve data/one or more files stored in the external storage device 120. In some embodiments, the cleaning station 110 may include a display interface 150 that allows a user to interact with the cleaning station 110. In some embodiments, the cleaning station 110 may include a support structure 160 that supports the display interface 150.

In some embodiments, the cleaning station 110 may include a control unit 201 (shown in FIG. 2) configured to scan and decontaminate the external storage device 120 from cybersecurity threats, and generate an electronic certificate to indicate decontamination performed thereon. The electronic certificate may be stored in the external storage device 120 through the port 130. The manner of scanning, decontaminating, and certifying the external storage devices 120 have been described in detailed in reference to FIG. 2.

In some examples, the cybersecurity threats may be indicative of any of including, but not limited to, viruses, malware, and the like. In further examples, the cybersecurity threats may include, but not limited to, worms, trojans, ransomware, spyware, adware, roque software, wipers, keyloggers, or malicious (i.e. intended to harm) executable code or script. In some embodiments, the code or script may be hidden or embedded in a normally non-malicious data or code in the external storage device 120. In some embodiments, the cybersecurity threats may be manually loaded to the external storage device 120 by a cyber attacker. In such embodiments, the cybersecurity threats may be configured to infect the computing devices to which the external storage device 120 is connected. Once the cybersecurity threat is accessed/loaded by an otherwise healthy computing device, the cybersecurity threat may infect and replicate into the healthy computing device. In other embodiments, the cybersecurity threats may be self-replicating, and may infect the external storage device 120 when it is plugged into an infected computing device, or when the user clicks or downloads malware from unverified links or emails. In some examples, the cybersecurity threat may also infect other computing devices connected to the healthy computing device.

In some embodiments, the port 130, the display interface 150, and the control unit 201 may be accommodated in/supported on the support structure 160. The form factor of the cleaning station 110/support structure 160 may be suitably adapted based on requirements. In some embodiments, the cleaning station 110 may have a rigid construction, and may be implemented as a permanent fixture, as shown in FIGS. 1A and 1D. In such embodiments, the cleaning station 110 may be implemented as a standalone kiosk that allows users to decontaminate their external storage devices 120. The users, in such embodiments, may interact with the cleaning station 110 via the display interface 150 thereof for sanitizing the external storage device 120, and/or verify and view the validity of the electronic certificate in the external storage device 120. Such cleaning stations 110 may be installed at desks, brackets, or other workplace environments. In other examples, such cleaning stations 110 may be installed in public places, such as roads, streets, commercial centers, tourist locations, high-traffic areas, offices, industrial settings, homes, and the like.

In other embodiments, the cleaning station 110 may be implemented on a portable electronic device. In some embodiments, the cleaning station 110 may be implemented in any one or a combination of including, but not limited to, smartphones, Personal Assistant Devices, tablets, phablets, laptops, desktops, portable electronic displays, and the like, as shown in FIG. 1B. In other embodiments, the cleaning station 110 may be implemented into an application-specific hardware device, as shown in FIG. 1C. In some examples, such cleaning stations 110 may be implemented as an accessory device, and may be hung on a wall, for example, or integrated into appliances, such as in furniture in meeting rooms.

In some embodiments, the cleaning station 110 may be installed conveniently at any one or a combination of public places, workplaces, commercial settings, industrial settings, homes, and the like. In some embodiments, the cleaning station 110 may be constructed to have provable integrity and authenticity in demanding operational circumstances such as commercial/business locations, home, or in industrial control locations employing Supervisory Control And Data Acquisition (SCADA) systems, rugged computers, and devices and tools in interaction with industrial operations. To sanitize the external storage devices 120, the users may connect the external storage device 120 to the cleaning station 110 through, for example, the port 130.

In some embodiments, the cleaning station 110 may be encased in metal. In other embodiments, the cleaning station 110 may be made of industrial quality components to withstand the demanding environments thereof. In some embodiments, the casing of the cleaning station 110 may be packaged with security screws and security seals to allow the users to see and detect any malevolent trauma delivered to the cleaning station 110. In some examples, the cleaning station 110 may be made using military standards materials such as MIL-STD-810H and MIL-STD-461 or even ATEX, but not limited thereto.

In some embodiments, the support structure 160 may accommodate the display interface 150. In some embodiments, the display interface 150 may include a display, such as a monitor or a screen operable by the cleaning station 110, and an input unit, such as a touchscreen or a keyboard configured to allow the cleaning station 110 to receive inputs from the user. In some examples, the cleaning station 110 may be configured to prompt the user to provide a password for decrypting, and scanning otherwise encrypted data in the external storage device 120. In some embodiments, the control unit 201 may be configured to transmit a signal to the display interface 150 of the cleaning station 110 to indicate the presence of the one or more cybersecurity threats in the external storage device 120. In some embodiments, the display interface 150 may also allow users/operators of the cleaning station 110 to select mode of decontaminating the cybersecurity threats in the external storage device 120.

In some embodiments, the support structure 160 may accommodate one or more of the ports 130. In some embodiments, the port 130 may be indicative of a female USB port configured to receive a male USB port of the external storage device 120. In other embodiments, the port 130 may be connected to the external storage device 120 using an adaptor means. The adapter means may be wired means (such as using a cable configured to adapt a plurality of ports to USB) or wireless means (such as using any one of Bluetooth, telecommunication, Wireless Fidelity (Wi-Fi), but not limited thereto), and may be configured to enable exchange of the data therebetween.

In some embodiments, on establishing connection between the cleaning station 110 and the external storage device 120 through the port 130, the cleaning station 110 may cause the external storage device 120 to power up and allow access to the data stored therein. The cleaning station 110 may include drivers that enable the cleaning station 110 to access data from the external storage device 120. In embodiments where the cleaning station 110 is connected to the external storage device 120 via a cable, the cleaning station 110 may supply power to the external storage device 120 through the cable. In such embodiments, the cleaning station 110 may include a power source, such as a battery or connected to a power grid, for example. The cleaning station 110, using the control unit 201, may retrieve and process the data stored in the external storage device 120 for scanning and decontamination.

Figure 2:
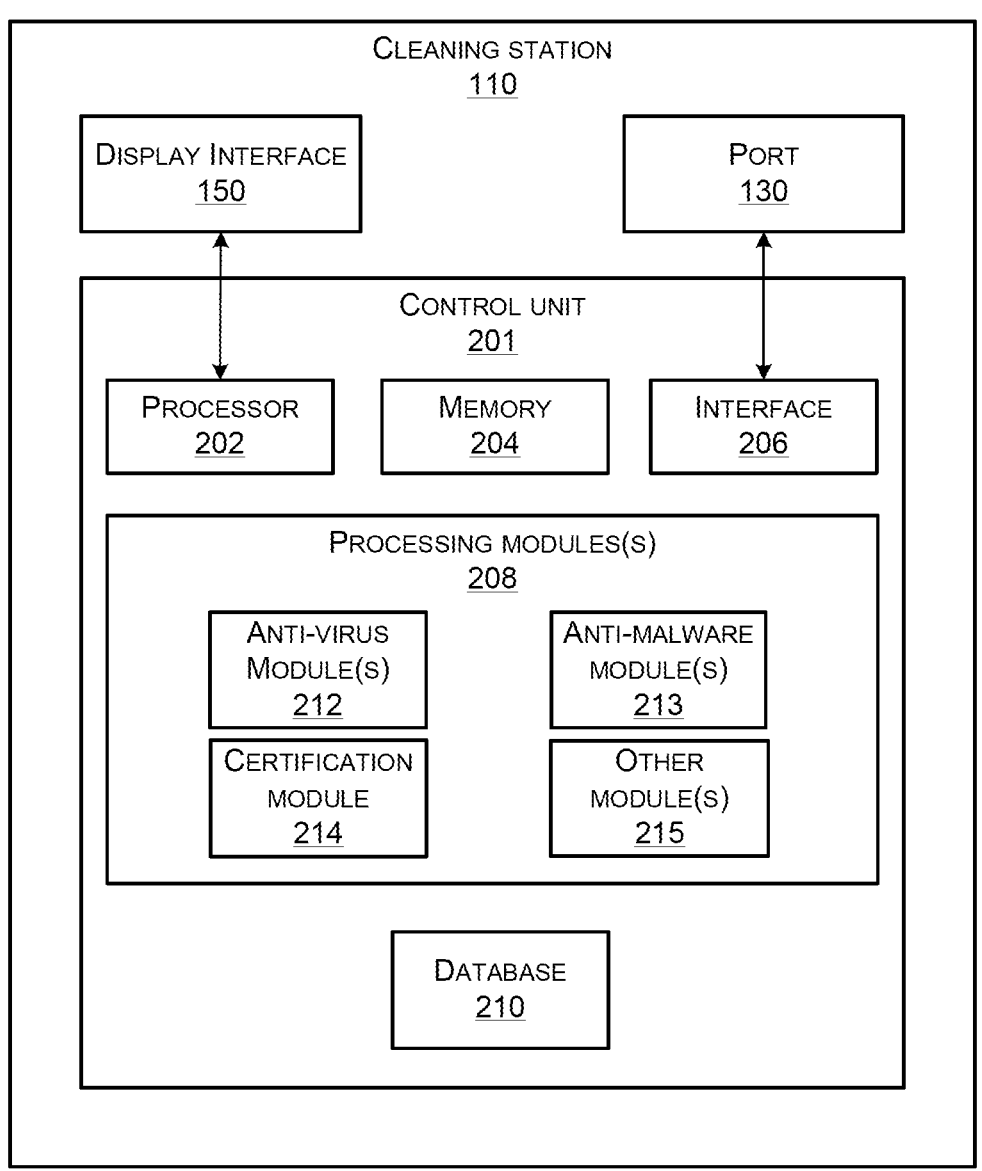
FIG. 2 illustrates an example block diagram of the cleaning station, according to embodiments of the present disclosure.
Figure 3A:
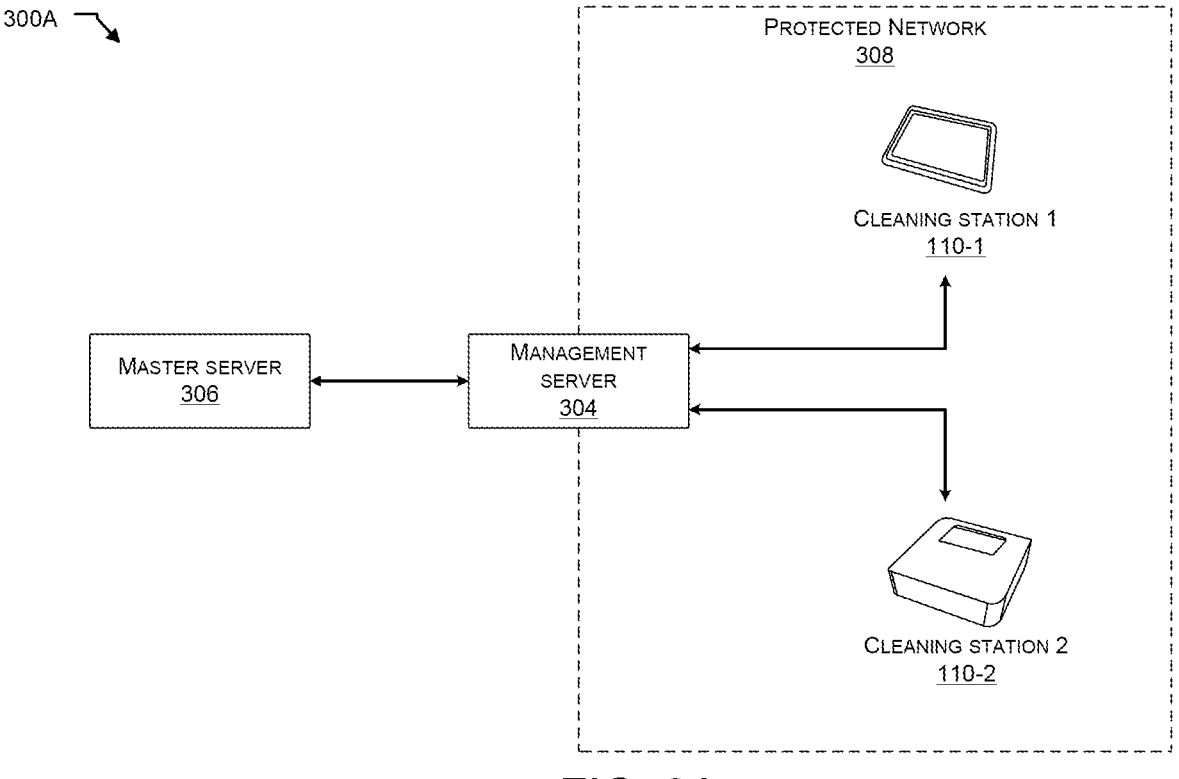
FIGS. 3A and 3B illustrate example network architectures implementing the cleaning station for decontamination of external storage devices, according to embodiments of the present disclosure.
Figure 3B:
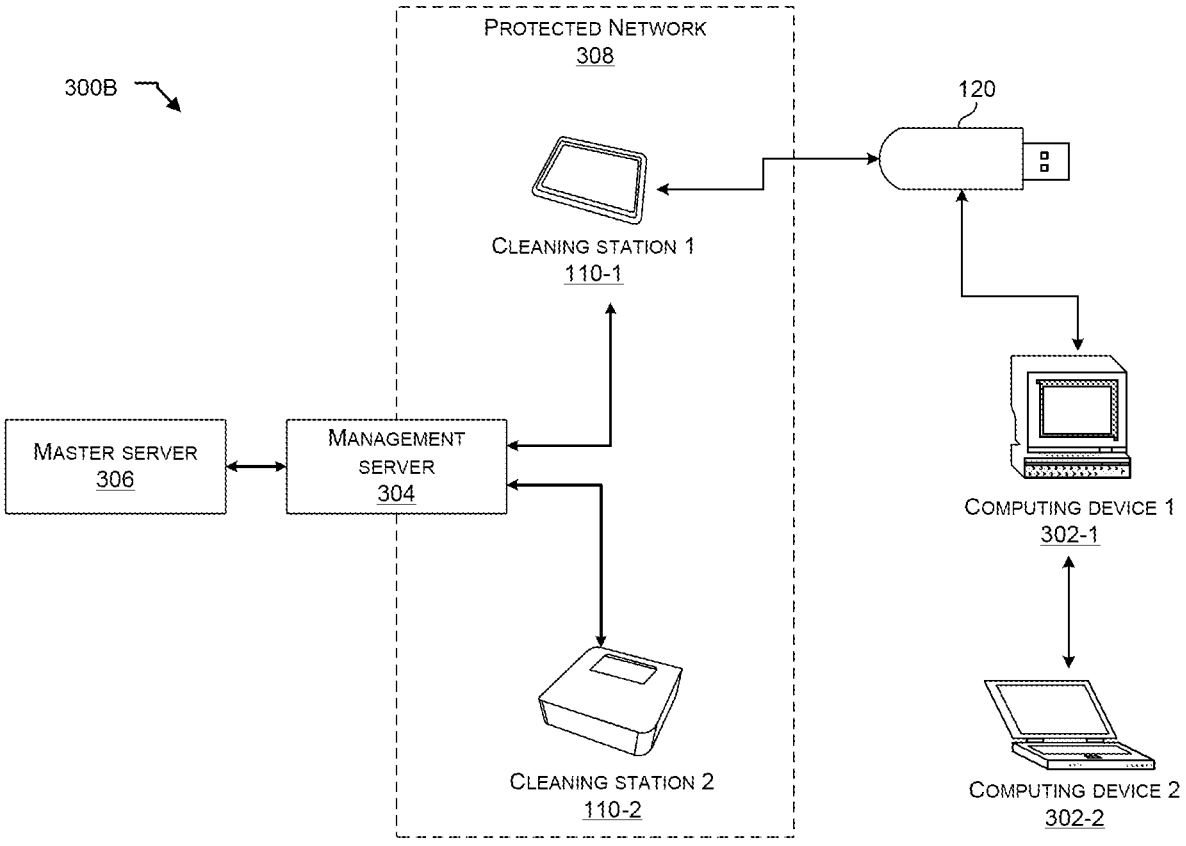

Referring to FIG. 2 that shows a block diagram 200 of the cleaning station 110, the control unit 201 of the cleaning station 110 may include a processor 202, a memory 204, and an interface 206. In some embodiments, the processor 202 may be implemented as one or more microprocessors, microcomputers, microcontrollers, digital signal processors, central processing units, logic circuitries, and/or any devices that process data based on operational instructions. Among other capabilities, the processor 202 may be configured to fetch and execute computer-readable instructions stored in the memory 204. The memory 204 may be configured to store one or more processor-readable/processor-executable instructions or routines in a non-transitory storage medium, which may be fetched and executed to create or share data packets over a network service. The memory 204 may include any non-transitory storage device including, for example, volatile memory such as random-access memory (RAM), or non-volatile memory such as erasable programmable read only memory (EPROM), flash memory, and the like. In some embodiments, the interface 206 may be configured to allow the processor 202 to communicate with the external storage device 120. In some embodiments, the interface 206 may be embedded into the port 130 to allow transmission and/or reception of data from and to the processor 202. In other embodiments, the interface 206 may be connected to the port 130. The interface 206 may also allow the control unit 201 to communicate with other computing devices (302-1, 302-2), a management server 304, a master server 306 (as shown in FIGS. 3A-3B), or the display interface 150.

In some embodiments, the memory 204 may include processor-executable instructions to scan, decontaminate, and certify the external storage device 120. The control unit 201 may use the processor 202 to execute the processor-executable instructions in the memory 204 when the external storage device 120 is connected to the cleaning station 110 via the port 130.

In some embodiments, the control unit 201, using the processor 202, may be configured to scan one or more files in the external storage device 120 connected to the cleaning station 110 to determine a presence of any cybersecurity threats therein. In some embodiments, the control unit 201 may scan the external storage device 120 using a decontamination means. In some embodiments, the decontamination means may include one or more anti-virus modules 212 and one or more anti-malware modules 213. In a preferred embodiment, the number of anti-virus modules 212 may be between 2 to 5, as selected by operators of the cleaning stations 110, and the number of anti-malware modules 213 may be at least one. In some examples, the anti-virus modules 212 may be any one or a combination of ClamAV®, WITH (by F-secure®), ESET®, Avast®, McAfee®, Bitdefender®, and the like, but not limited thereto. In some examples, the anti-malware modules 213 may be indicative of Airbus® Orion. In some embodiments, using a plurality of anti-malware modules 213 and anti-virus modules 212 may allow for detection of, without limitation, unknown threats, newly discovered cybersecurity threats, Advanced Persistent Threats (APT) attacks, BadUSB attacks, USB kill switch attacks executed on user's computing devices through the external storage device 120, operated unknown (0day) vulnerabilities, and the like, among other known cybersecurity threats.

In some embodiments, the decontamination means may be configured to detect the presence of cybersecurity threats in the external storage device 120. In some embodiments, to detect the presence of the cybersecurity threats, the decontamination means may use any one or a combination of malware detection techniques including source code analysis, virus/malware signature analysis, checking file integrity, dynamic detection through emulation, or execution of data/files in a sandbox, a virtual machine, or a sacrificial computing device, and monitoring inputs and outputs, memory allocation, and the like for suspicious activities, heuristic analysis, machine learning/Artificial Intelligence (AI) predictions, or a combination thereof, but not limited thereto.

In embodiments where the decontamination means detect the presence of cybersecurity threats are detected using virus/malware signatures, the decontamination means may maintain a database 210 having signatures associated with the cybersecurity threats. In some embodiments, the database 210 may be periodically updated by signals received from a master server through a management server (such as master server 306 through the management server 304 as shown in FIGS. 3A-3B). In some embodiments, the decontamination means may be configured to read the data/files in the external storage device 120 in read-only mode so as to prevent execution thereof. The decontamination means may then compare and analyze the data to detect cybersecurity threats stored therein using the malware detection techniques, such as by comparing the files with the signatures in the database 210. In some embodiments, the decontamination means may allow users to configure custom rules for detecting the cybersecurity threats and decontaminating the external storage device 120.

In some embodiments, to scan the files to determine the presence of the cybersecurity threats therein, the processor 202 may be configured to successively scan one or more partitions that partition the files in the external storage device 120. In some embodiments, the one or more partitions may be scanned parallelly by each of the anti-virus modules 212 and the anti-malware modules 213. In some embodiments, the control unit 201 may be configured to concurrently scan and decontaminate each of the partitions in the external storage device 120 using each of the decontamination means. In such embodiments, parallel processing may reduce the processing time for determining presence of cybersecurity threats stored in the files. In some embodiments, the control unit 201 may be prevented from deadlocks due to parallel/concurrent processing of corresponding partitions by the anti-virus modules 212 and the anti-malware modules 213.

In some embodiments, the control unit 201 may be configured to receive a bypass signal from the user through the display interface 150. In such embodiments, the bypass signal may indicate a partition from the one or more partitions that is to be skipped from scanning. In some embodiments, the user may indicate that certain partitions may be skipped if the user knows the files in those partitions to safe, and/or when the files in said partitions have or are likely to be falsely determined to have cybersecurity threats, such as when the files have similar signatures as those of a known virus or a malware but are known to be safe by the user. In some embodiments, the control unit 201 may be configured to skip the scanning of the partitions based on the bypass signal. In some embodiments, the control unit 201 may be configured to indicate the one or more partitions created to the users through the display interface 150. In some embodiments, the users may provide the bypass signal to the control unit 201 by interacting with the display interface 150.

In some embodiments, in response to a positive determination of the presence of the cybersecurity threats in the one or more files, the control unit 201, using the processor 202, may be configured to decontaminate the external storage device 120 from the cybersecurity threats using the decontamination means. In some embodiments, decontaminating the external storage device 120 may include detecting, isolating and neutralizing the cybersecurity threat, and deleting/removing the cybersecurity threat from the external storage device 120.

In some embodiments, on detecting the cybersecurity threats, the processor 202 may be configured to transmit a signal to the display interface 150 to indicate the presence of the cybersecurity threats in the external storage device 120. In such embodiments, the user/operator of the cleaning station 110 may view the cybersecurity threats present in the external storage device 120, and may select a preferred mode/manner of handling the cybersecurity threat. In some examples, the user may select whether to neutralize and remove (by deleting) the cybersecurity threat, or isolate/quarantine the cybersecurity threat within the external storage device 120 in case deleting the cybersecurity threat may cause damage to other files in said external storage device 120. In some embodiments, the decontamination means may also be configured to repair the files in the external storage device 120 after deleting the cybersecurity threats. In some embodiments, the control unit 201 may be configured to receive a decontamination method signal from the display interface 150, where the decontamination method signal may include an instruction from the user/operator to either remove, neutralize, or isolate the one or more cybersecurity threats, and/or repair the one or more files in the external storage device 120. In some embodiments, the control unit 201 may be configured to decontaminate the files in the external storage device 120 based on the instruction in the decontamination method signal. In some embodiments, the decontamination means may generate a scanning report after the data is scanned and decontaminated. In such embodiments, the control unit 201 may display the scanning report on the display interface 150.

In some embodiments, in response to a negative determination of the presence of the one or more cybersecurity threats, or on decontaminating the external storage device 120, the control unit 201 may generate and store the electronic certificate on the external storage device 120. In some embodiments, the control unit 201 may be configured to use a certification module 214 to generate and store the electronic certificate.

In some embodiments, the control unit 201 may be configured to use a certification module 214 to generate the electronic certificate to indicate that the external storage device 120 has been decontaminated and is safe to use. The electronic certificate may validate that the usage of the external storage device 120 is safe to access and load on computing devices (such as computing devices 302-1, 302-2 as shown in FIG. 3B, and collectively referred to as computing devices 302) of the user.

In some embodiments, the electronic certificate may be created using cryptographic means. In such embodiments, the certification module 214 may be configured to use a private key associated with the cleaning station 110 to sign/encrypt a hash value generated from the data/files stored in the external storage device 120. In other embodiments, the certification module 214 may sign/encrypt the scanning report generated by the decontamination means. In some examples, after decontamination of the external storage device 120, the user may connect the external storage device 120 to their computing devices 302. In such examples, the computing device 302 may verify the validity of the electronic signature, using the endpoint module. In such embodiments, the electronic certificate may be verifiable using the endpoint module.

In some embodiments, the endpoint module may include a public key, which may be used to verify the hash value of the data in the external storage device 120. In some embodiments, the private and the public keys may be generated based on serial numbers of the components associated with the cleaning station 110. In some embodiments, the electronic certificate may be configured to be invalidated when data in the external storage device 120 may be modified. In some examples, if the data/files were not modified between decontamination of the external storage device 120 and connecting the external storage device 120, the verification may be successful. However, if the data in the external storage device 120 is modified, the verification may fail due to differences in the hash value.

In some embodiments, the electronic certificate may be configured to self-destruct when the data in the external storage device 120 is modified. In some embodiments, the electronic certificate may include a time stamp value indicating a time at which a time stamp was created. In such embodiments, the electronic certificate may be configured to expire after a predetermined duration since the time stamp value has elapsed. The endpoint module may be configured to invalidate the electronic certificate if a predetermined duration of time has elapsed since the time stamp value. In some embodiments, the endpoint module may be configured to determine that the electronic certificate is valid when both the files in the external storage device 120 have not been modified, and the time elapsed since the time stamp value is within the predetermined duration.

In some embodiments, the control unit 201 may include one or more processing modules 208, which may include, without limitation, the one or more anti-virus modules 212, the one or more anti-malware modules 213, the certification module 214, and other modules 215. Each of the processing modules 208 disclosed herein may be implemented as any one of including, but not limited to, processors, such as processor 202, an Application-Specific Integrated Circuit (ASIC), an electronic circuit, and memory that execute one or more software or firmware programs, a combinational logic circuit, and/or other suitable components that provide the described functionality.

While in some embodiments, each of the processing modules 208 may be embedded within the control unit 201, in other embodiments, any one or more of the processing modules 208 may be implemented externally to the control unit 201, or as standalone electronic devices. In such embodiments, the cleaning station 110 or the control unit 201 may be communicatively connected to the processing modules 208 via a communication means. The communication means may be wired or wireless. In some embodiments, wired communication means may include, but not be limited to, electrical wires/cables, optical fiber cables, telephony, and the like. In some embodiments, the wireless communication means may be any wireless communication network capable of transferring data using means including, but not limited to, radio communication, satellite communication, a Bluetooth, a Zigbee, a Near Field Communication (NFC), a Wi-Fi network, a Light Fidelity (Li-FI) network, the Internet, a carrier network including a circuit-switched network, a packet switched network, cellular telecommunication networks, combinations thereof, and the like.

In some applications, the user/operator may insert the external storage device 120, such as an USB device, for example, into the port 130 of the cleaning station 110. In such applications, at least one of the cleaning stations 110 may be deployed in proximity to the computing device 302, such as a SCADA system, for example, used by the user. The cleaning station 110 may be configured to retrieve data stored in the external storage device 120, and may scan the data/files stored therein for presence of cybersecurity threats. If cybersecurity threats are detected, the cleaning station 110 may decontaminate the external storage device 120. When the external storage device 120 is decontaminated, or no cybersecurity threats are detected in the external storage device 120, the cleaning station 110 may generate and store the electronic certificate in the external storage device 120. The user may then remove the external storage device 120 from the cleaning station 110, since the external storage device 120 may be safe or free from cybersecurity threats. The user may safely insert the external storage device 120 into any computing device 302. The computing device 302 may be configured to verify validity of the electronic certificate stored in the external storage device 120, and may retrieve and execute files therein when the verification is successful. In other embodiments where the verification fails, the computing device 302 may be prevented from accessing the files in the external storage device 120. In such applications, the cleaning station 110 may provide an external device that verifiably allows external storage devices 120 to be scanned and decontaminated, before they are used in (safety-critical) computing devices 302. Further, since the computing devices 302 are configured to read and execute files in the external storage device 120 when they have valid electronic certificates, the computing devices 302 may be protected from cyber attackers deliberately plugging in cybersecurity threats, such as USB kill switches, for example, into the computing device 302, thereby enhancing security.

In some implementations, one or more of the cleaning stations 110 may be deployed and managed in proximity to the computing devices 302 operated by the user. Referring to FIGS. 3A-3B, network architectures 300A and 300B implementing the master server 306 connected to one or more cleaning stations 110 through a management server 304 is illustrated. As shown, the network architecture 300A, 300B may include the master server 306, one or more of the cleaning stations 110-1, 110-2 (collectively referred to as cleaning stations 110), one or more of the computing devices 302-1, 302-2 (collectively referred to as computing devices 302), and a management server 304.

In some embodiments, the one or more cleaning stations 110 may form a protected network 308. In some embodiments, the cleaning stations 110 may be managed by the master server 306. In some embodiments, the cleaning stations 110 may communicate directly with the master server 306. In some preferred embodiments, the cleaning stations 110 and the master server 306 may communicate with each other through the management server 304. In some embodiments, the cleaning stations 110 may be configured to be updated by the master server 306. In such embodiments, the cleaning stations 110 may update the decontamination means, such as, for example, update the virus/malware signature databases, software updates for maintenance and upgradation of the anti-virus modules 212 and the anti-malware modules 213, and the like.

In some embodiments, the cleaning station 110 may be configured to transmit an update request signal to the master server 306 at predetermined intervals. In some embodiments, the update request signal may include an Internet Protocol (IP) address associated with the cleaning station 110. The IP address may be used by the master server 306 to verify identity of the cleaning stations 110. In some embodiments, the cleaning station 110 may be configured to receive an update signal from the master server 306, and update the one or more anti-virus modules 212 based on the update signal. The update signal may be received in response to the update request signal. The update signal may include, without limitation, one or more signature updates, and updation and configuration information for updating the decontamination means of the cleaning stations 110.

In some embodiments, the cleaning stations 110 in the protected network 308 may be air-gapped. In such embodiments, the cleaning stations 110 may be prevented from communicating with other devices, including, the master server 306 or the management server 304. In such embodiments, the cleaning stations 110 may be configured to receive the update signal from the trusted external storage device. The trusted external storage device may be loaded with one or more signature updates in the update signal from the master server 306. When the trusted external storage device is inserted into the cleaning station 110, the update signal may be transmitted to the cleaning station 110, thereby updating the decontamination means thereof.

In some embodiments, the master server 306 may be configured to manage and update the cleaning stations 110. In some embodiments, the master server 306 may be a centralized server configured to receive and transmit the updates to the cleaning stations 110. In some embodiments, the master server 306 may include a processor, and a memory having one or more processor-executable instructions.

In some embodiments, the master server 306 may be configured to transmit a set of initialization signals to install the decontamination means in the cleaning stations 110. The set of initialization signals may be provided to the master server 306 by one or more vendors, through corresponding servers managed by the vendors. Once the hardware associated with the cleaning stations 110 are deployed on the user's premises, the set of initialization signals may be used to install the decontamination means in each of the cleaning stations 110. In some embodiments, the user may choose the anti-virus modules 212 and the anti-malware modules 213 to be installed in the cleaning stations 110.

In some embodiments, the master server 306 may be configured to receive one or more signature updates for one or more anti-virus modules 212 of a decontamination means from corresponding vendors thereof. In some embodiments, the vendors may be manufacturers of the anti-virus modules 212. In some embodiments, the vendors may identify signatures associated with newly discovered viruses, and may transmit the signatures to the master server 306 through signature updates/signature update signals. Being in communication with the one or more vendors allows the master server 306 to receive the signature updates for the new viruses as soon as they are identified, thereby shortening the time for which the new viruses remain undetectable by the decontamination means in the cleaning stations 110.

In some embodiments, the master server 306 may be configured to receive an update request signal from the cleaning stations 110 either directly or through the management server 304. In some embodiments, the master server 306 may verify identity of the cleaning stations 110 or the management server 304. In some embodiments, the identity of the cleaning stations 110 or the management server 304 may be verified using a corresponding IP address provided in the update request signal. On successful verification, the master server 306 may transmit the update signal having the signature updates to the cleaning stations 110 either directly or through the management server 304.

In some embodiments, the cleaning stations 110 may be configured to transmit the update request signal and receive the update signal to and from the master server 306, respectively, through the management server 304. In some embodiments, the update request signal and the update signal may be transmitted as Application Programming Interface (API) methods.

In some embodiments, the master server 306 may be configured to transmit the set of initialization signals and the update signals to the cleaning stations 110 through the management server 304. In such embodiments, the master server 306 may be configured to establish an encrypted communication channel with the management server 304. In some embodiments, to establish the encrypted communication channel, the master server 306 may be configured to verify identity of the management server 304. In some embodiments, the management server 304 may include a puppet agent module and the master server 306 may include a puppet master module. The puppet agent module may be configured to transmit a certificate signing request (CSR) to the puppet master module. The puppet master module may be configured to sign, and thereby approve, a cryptographic certificate based on the information provided in the CSR. The cryptographic certificate may be transmitted to the puppet agent module along with corresponding cryptographic keys to enable transmission of encrypted messages between the management server 304 and the master server 306. In such embodiments, the master server 306 may be configured to transmit the update signal to the management server 304 at a predetermined updating interval based on one or more configuration parameters associated with the management server 304. In some embodiments, the configuration parameters may include, but not be limited to, files, packets to be installed, anti-virus signatures, permissioning, and other rules defined by the operator of the management server 304.

In some preferred embodiments, the encrypted communication channel may be indicative of a Secure Socket Layer (SSL) or Transport Security Layer (TLS) communication protocols. In other embodiments, the encrypted communication protocol may be any one of including, but not limited to, Datagram Transport Layer Security (DTLS), Internet Protocol Security (IPSec), Secure Shell (SHH), and the like.

In some embodiments, the management server 304 may be configured to receive, transmit, and coordinate signals transmitted between the cleaning stations 110 and the master server 306. In some embodiments, the management server 304 may be implemented as a Software as a Service (SaaS) configured to facilitate communication in the network architecture 300A, 300B. The management server 304 may also be configured to perform including, but not limited to, feature configuration, activity reporting, accountability, user management, and the like.

In some embodiments, the cleaning station 110 may be configured to transmit activity data to the management server 304, the activity data being generated during scanning and decontamination of the one or more files and generating the electronic certificate. In some embodiments, the activity data may include, but not be limited to, logs, number of scans performed, number of decontaminations performed, distribution of decontaminations, one or more key performance indicators (KPIs) determined by an operator, types of devices connected thereto, and the like. In some embodiments, the activity data may be received by the management server 304 either in real-time or in predetermined intervals. In some examples, the management server 304 may receive the activity data from the cleaning stations 110, as well as retrieve, without limitation, metadata, such as scanned drive name, ID, number of files, identified threats, processing engines/modules used, scanning data, scanning duration, skipped files, data/storage size, and the like.

In embodiments where the cleaning stations 110 are air-gapped from the management server 304, the activity data may be downloaded from the cleaning station 110 using the trusted external storage device, and then uploaded to the management server 304.

In some embodiments, the management server 304 may be configured to communicate with a security information and event management (SIEM) module. The management server 304 may be configured to communicate with the SIEM module using API methods. The management server 304 may be configured to transmit API requests to the SIEM module, and receive API responses in return. In some embodiments, the SIEM module may be configured to analyze the activity data, and generate reports (in Portable Document Format (PDF) or Comma Separated Value (CSV) formats), among other functions. In some embodiments, the management server 304 may provide a dashboard to analyze the activity data. In some embodiments, the dashboard may allow the user to visualize the reports generated by the SIEM module.

The management server 304 may also allow for precise user administration, user groups and user rights management, such as, for example, feature by feature, view/modify per feature, per cleaning station, per groups of cleaning stations, per user groups, user accounting, user monitoring, and the like. The management server 304 may be configured to communicate with the cleaning stations 110 via an upstream SSL or an upstream TLS 1.3 OpenVPN. In some embodiments, the management server 304 may communicate with the computing devices 302 and/or the cleaning stations 110 using protocol break or media break communication protocols.

In some embodiments, the management server 304 may be implemented as a computing device within the protected network 308, or on premises of the protected network 308. In such embodiments, the management server 304 may serve as a firewall for the network of cleaning stations 110, as shown in FIG. 3A. In other embodiments, the management server 304 may be deployed in any one of including, but not limited to, cloud, online, air gapped networks, and the like.

In some embodiments, the user's premises may include one or more computing devices, such as computing devices 302-1, 302-2. In some embodiments, the computing devices 302 may be any one of including, but not limited to, smartphones, tablets, phablets, laptops, desktops, servers, printers, photocopiers, SCADA systems, industrial equipment, autonomous robots, and the like. In such embodiments, the protected network 308 may be indicative of a network of interconnected devices, such as those in industrial, commercial, and business settings. In such embodiments, the computing devices 302 may be prevented from accessing data not having the electronic certificates. In some embodiments, the protected network 308 may include the computing devices 302.

In some embodiments, the endpoint module may be implemented on any of the cleaning stations 110, or the computing devices 302. Techniques used by the endpoint module may be suitably adapted based on the techniques used by the certification module 214 to generate the electronic certificates. In some embodiments, the computing devices 302 may include the endpoint modules. In some embodiments, the endpoint module may be configured to verify the validity of the electronic certificate created and stored in the external storage device 120 by the cleaning station 110.

In embodiments where each of the computing devices 302 are configured with a corresponding endpoint module, the endpoint module may be configured to verify validity of the electronic certificate stored in the external storage device 120. When the external storage device 120 is scanned and decontaminated by the cleaning station 110, the electronic certificate may be stored therein. The external storage device 120, when inserted/connected to the computing devices 302 as shown in FIG. 3B, the electronic certificate therein may be verified by the endpoint module. If the electronic certificate is valid, the endpoint module may allow the computing device 302 to access, i.e. read and/or execute, the files in the external storage device 120. In other embodiments, when the electronic certificate is invalid, either because a predetermined amount of time has elapsed since the generation of the electronic certificate, or when the files in the external storage device 120 are modified after the generation of the electronic certificate, or when the electronic certificate is fake or not created by the authorized cleaning stations 110, the endpoint module may prevent the computing device 302 from reading and/or executing the files in the external storage device 120.

In some embodiments, the endpoint module may be (de)activatable by the management server 304. In such embodiments, the endpoint module may have a security token associated therewith, which may be activated or deactivated by the management server 304, such as when the endpoint module is compromised and an update therefor is required, for example. Further, in such embodiments, the endpoint module may be implemented at a driver level thereof.

In embodiments where the endpoint module is implemented in the cleaning stations 110, the cleaning stations 110 may use the endpoint module to verify the validity of the electronic certificates stored in the external storage devices 120. In such embodiments if a valid electronic certificate is stored in the external storage device 120, the cleaning station 110 may skip scanning and decontaminating the external storage device 120. In some examples where the external storage device 120 is reinserted into the cleaning stations 110 within few minutes of scanning/decontaminating, or when the data in the external storage device 120 has not been modified since the previous scan/decontamination, the cleaning station 110 may be prevented from performing redundant scans/decontaminations on such external storage devices 120, thereby proving savings in computational resource expenditure.

In some preferred implementations, the user may have a plurality of computing devices 302 at their premises. The users may also deploy a network of cleaning stations 110 in their premises that may be used to decontaminate the external storage devices 120, before they are plugged into the computing devices 302. In some embodiments, the cleaning stations 110 may be managed using the management server 304 within the premises. The management server 304 may provide a dashboard for the users to manage and maintain the cleaning stations 110, and may also facilitate communication with the master sever 306 for updating the cleaning stations 110. When the external storage device 120 is inserted into any one of the cleaning stations 110, the cleaning station 110 may scan and decontaminate the external storage device 120 from cybersecurity threats, and may generate and store electronic certificates in the external storage device 120. The computing devices 302 may include the endpoint module that is configured to verify the validity of the electronic certificate in the external storage device 120, and either allow the computing device 302 to access the files therein based on policies specified by the user. The cleaning station 110, and the master server 306 and the management server 304, hence, may provide a convenient means to safely and verifiably scan and decontaminate the external storage device 120 to secure the computing devices 302 from cybersecurity threats. Further, the cleaning station 110 may scan and decontaminate the external storage device 120 with reduced computational resources, thereby decreasing waiting times, while also providing a comprehensive scan and decontamination through use of a plurality of anti-virus modules 212 and anti-malware modules 213.

FIG. 4 illustrates a flowchart of an example method 400 for decontaminating an external storage device, in accordance with embodiments of the present disclosure.

At block 402, the method 400 may include inserting an external storage device into a cleaning station.

At block 404, the method 400 may include accessing, by a processor of the cleaning station, one or more files stored in the external storage device.

At block 406, the method 400 may include decontaminating, by the processor, one or more cybersecurity threats in the one or more files in the external storage device using a decontamination means. In some embodiments, the decontamination means includes one or more anti-virus modules and one or more anti-malware modules.

At block 408, the method 400 may include generating and storing, by the processor, an electronic certificate in the external storage device, where the electronic certificate is verifiable by an endpoint module.

Figure 5:
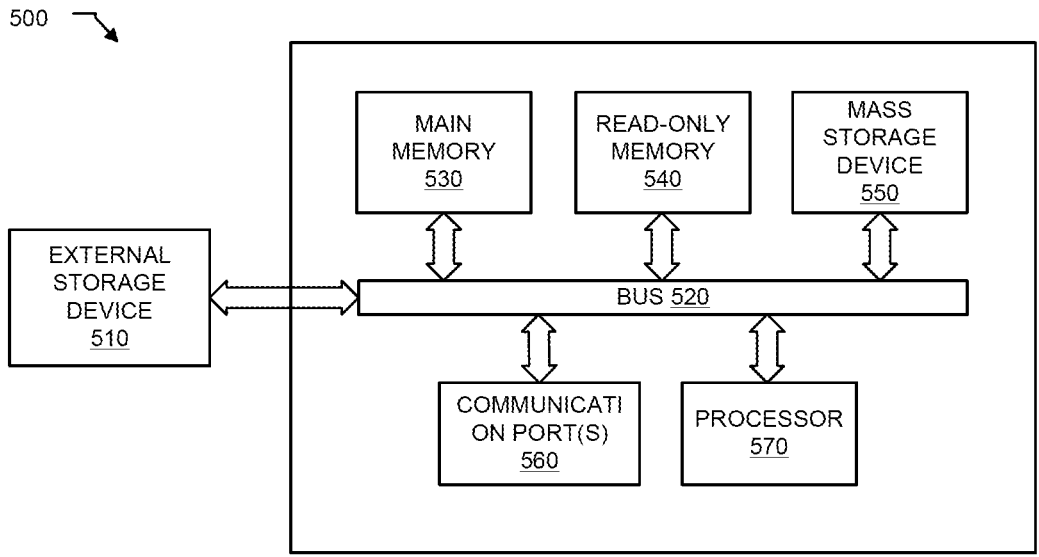
FIG. 5 illustrates a block diagram of an example computer system in which or with which embodiments of the present disclosure may be implemented.

FIG. 5 illustrates a computer system 500 in which or with which embodiments of the present disclosure may be implemented. In particular, the disclosed system, i.e. the master server 306, may be implemented as the computer system 500.

Referring to FIG. 5, the computer system 500 may include an external storage device 510, a bus 520, a main memory 530, a read-only memory 540, a mass storage device 550, communication port(s) 560, and a processor 570. A person skilled in the art will appreciate that the computer system 500 may include more than one processor and communication ports. The communication port(s) 560 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 560 may be chosen depending on a network, such a Local Area Network (LAN), Wide Area Network (WAN), or any network to which the computer system 500 connects. The main memory 530 may be random access memory (RAM), or any other dynamic storage device commonly known in the art. The read-only memory 540 may be any static storage device(s) including, but not limited to, a Programmable Read Only Memory (PROM) chips for storing static information e.g., start-up or basic input/output system (BIOS) instructions for the processor 570. The mass storage device 550 may be any current or future mass storage solution, which may be used to store information and/or instructions. The bus 520 communicatively couples the processor 570 with the other memory, storage, and communication blocks. The bus 520 can be, e.g. a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor 570 to the computer system 500. Optionally, operator and administrative interfaces, e.g. a display, keyboard, and a cursor control device, may also be coupled to the bus 520 to support direct operator interaction with the computer system 500. Other operator and administrative interfaces may be provided through network connections connected through the communication port(s) 560. In no way should the aforementioned exemplary computer system limit the scope of the present disclosure.

One of ordinary skill in the art will appreciate that techniques consistent with the present disclosure are applicable in other contexts as well without departing from the scope of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A cleaning station, comprising:
a processor; and a memory operatively coupled with the processor, wherein the memory comprises processor-executable instructions which, when executed by the processor, cause the processor to:

scan one or more files in an external storage device connected to the cleaning station to determine a presence of one or more cybersecurity threats using a decontamination means, the decontamination means comprising two or more anti-virus modules and one or more anti-malware modules;

in response to a positive determination of the presence of the one or more cybersecurity threats in the one or more files, decontaminate the external storage device from the one or more cybersecurity threats using the decontamination means; and in response to decontaminating the external storage device or a negative determination of the presence of the one or more cybersecurity threats, generate and store an electronic certificate on the external storage device, wherein when the external storage device is connected to a computing device, validity of the electronic certificate is verifiable by an endpoint module that is implemented on the computing device, and wherein on successful validation of the electronic certificate by the endpoint module, the one or more files in the external storage device are loaded and executed at the computing device.

2. The cleaning station of claim 1, wherein the processor is further configured to transmit a signal to a display interface of the cleaning station to indicate the presence of the one or more cybersecurity threats.

3. The cleaning station of claim 2, wherein the processor is further configured to:

receive a decontamination method signal from the display interface, wherein the decontamination method signal comprises an instruction from an operator to either remove, neutralize, or isolate the one or more cybersecurity threats, and/or repair the one or more files in the external storage device; and decontaminate the one or more files in the external storage device based on the instruction in the decontamination method signal.

4. The cleaning station of claim 1, wherein the processor is further configured to receive an update signal from a master server; and update the two or more anti-virus modules based on the update signal.

5. The cleaning station of claim 4, wherein the processor is further configured to:

transmit an update request signal to the master server at predetermined intervals, the update request signal comprising an Internet Protocol (IP) address associated with the cleaning station; and receive the update signal from the master server in response thereto.

6. The cleaning station of claim 5, wherein the processor is configured to transmit the update request signal and receive the update signal to and from the master server, respectively, through a management server.

7. The cleaning station of claim 1, wherein the processor is configured to transmit activity data to a management server, the activity data being generated during scanning and decontamination of the one or more files and generating the electronic certificate.

8. The cleaning station of claim 7, wherein the cleaning station is air-gapped from the management server, and wherein the processor is configured to offload the activity data to a trusted external storage device.

9. The cleaning station of claim 1, wherein the cleaning station is air-gapped, and wherein the processor is configured to receive an update signal from a trusted external storage device, and wherein the trusted external storage device is loaded with one or more signature updates in the update signal from a master server.

10. The cleaning station of claim 1, wherein to scan the one or more files to determine the presence of the one or more cybersecurity threats, the processor is configured to successively scan one or more partitions that partition the one or more files in the external storage device.

11. The cleaning station of claim 10, wherein the processor is further configured to:

receive a bypass signal from a user, the bypass signal indicating a partition from the one or more partitions that is to be skipped from scanning; and skip the scanning of the partition based on the bypass signal.

12. The cleaning station of claim 1, wherein the processor is configured to concurrently scan and decontaminate the one or more files in the external storage device using each of the two or more anti-virus modules and the one or more anti-malware modules.

13. The cleaning station of claim 1, wherein the electronic certificate comprises a time stamp value indicating a time at which a time stamp was created, and wherein the electronic certificate expires after a predetermined duration since the time stamp value has elapsed.

14. The cleaning station of claim 1, wherein the electronic certificate is configured to be invalidated when data in the external storage device is modified.

15. The cleaning station of claim 1, wherein the processor is further configured to generate the electronic certificate by cryptographically signing a hash value that is generated from the one or more files in the external storage device, using a private key associated with the cleaning station, wherein a public key is configured to be used by the endpoint module to verify the electronic certificate.

16. The cleaning station of claim 7, wherein the processor is configured to communicate with the management server using protocol break or media break communication protocols to transmit the activity data.

17. A method for decontaminating external storage devices, comprising:

inserting an external storage device into a cleaning station;

accessing, by a processor of the cleaning station, one or more files stored in the external storage device;

decontaminating, by the processor, one or more cybersecurity threats in the one or more files in the external storage device using a decontamination means, the decontamination means comprising two or more anti-virus modules and one or more anti-malware modules; and generating and storing, by the processor, an electronic certificate in the external storage device, wherein when the external storage device is connected to a computing device, validity of the electronic certificate is verifiable by an endpoint module that is implemented on the computing device, and wherein on successful validation of the electronic certificate by the endpoint module, the one or more files in the external storage device are loaded and executed at the computing device.

* * * * *